(12) United States Patent
Kim

(10) Patent No.: US 8,445,131 B2
(45) Date of Patent: May 21, 2013

(54) HOLDER CASE FOR SECONDARY BATTERY AND LITHIUM SECONDARY BATTERY USING THE SAME

(75) Inventor: Ho-Seong Kim, Yongin-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 6 days.

(21) Appl. No.: 12/805,859

(22) Filed: Aug. 20, 2010

(65) Prior Publication Data

US 2011/0117423 A1 May 19, 2011

(30) Foreign Application Priority Data

Nov. 17, 2009 (KR) .................... 10-2009-0110775

(51) Int. Cl.
*H01M 2/00* (2006.01)
*H01M 2/04* (2006.01)

(52) U.S. Cl.
USPC .......................................... 429/163; 429/176

(58) Field of Classification Search
USPC ...... 429/176, 96, 99, 100, 159, 163; 206/703, 206/705; D13/103
See application file for complete search history.

(56) References Cited

U.S. PATENT DOCUMENTS

| | | | | |
|---|---|---|---|---|
| 5,817,435 A | * | 10/1998 | Shimakawa et al. | 429/176 |
| 7,141,330 B2 | * | 11/2006 | Aoyama | 429/97 |
| 2005/0287426 A1 | * | 12/2005 | Kim et al. | 429/149 |
| 2006/0063067 A1 | * | 3/2006 | Kim | 429/148 |
| 2006/0216592 A1 | | 9/2006 | Chun | |
| 2006/0220615 A1 | | 10/2006 | Kim | |
| 2007/0281208 A1 | | 12/2007 | Yoon et al. | |
| 2009/0197160 A1 | | 8/2009 | Fujiwara et al. | |

FOREIGN PATENT DOCUMENTS

| | | | |
|---|---|---|---|
| JP | 8-273638 A | | 10/1996 |
| JP | 2006-40684 A | | 2/2006 |
| JP | 2006-338992 | | 12/2006 |
| JP | 2006338992 | * | 12/2006 |
| KR | 10-2004-0110254 | | 12/2004 |
| KR | 10-2005-0015006 | | 2/2005 |
| KR | 1020030053459 | * | 11/2005 |
| KR | 10-2006-0086720 A | | 8/2006 |
| KR | 10-2006-0111845 | | 10/2006 |
| KR | 1020050088399 | * | 2/2007 |

OTHER PUBLICATIONS

Korean Office action issued by KIPO on Feb. 15, 2012, corresponding to KR 10-2009-0110775 and Request for Entry attached herewith.

* cited by examiner

*Primary Examiner* — Ula C. Ruddock
*Assistant Examiner* — Thomas H. Parsons
(74) *Attorney, Agent, or Firm* — Robert E. Bushnell, Esq.

(57) ABSTRACT

A holder case for secondary battery having an improved longitudinal compression property and a lithium secondary battery using the same in which a case for secondary battery includes a case body and a first rib. The case body includes first and second long-side walls opposite to each other, first and second short-side walls, a bottom wall connected to one end portions of the two long-side walls and the two short-side walls, and an opening positioned at the other end portions of the two long-side walls and the two short-side walls while being opposite to the bottom wall. The first rib is disposed on the case body and extends from a middle portion of the first long-side wall to a middle portion of the second long-side wall via the second short-side wall.

11 Claims, 7 Drawing Sheets

HOLDER CASE FOR SECONDARY BATTERY AND LITHIUM SECONDARY BATTERY USING THE SAME

CLAIM OF PRIORITY

This application makes reference to, incorporates into this specification the entire contents of, and claims all benefits accruing under 35 U.S.C. §119 from an application earlier filed in the Korean Intellectual Property Office filed on Nov. 17, 2009 and there duly assigned Serial No. 10-2009-0110775.

BACKGROUND OF THE INVENTION

1. Field of the Invention

An aspect of the present invention relates to a holder case for secondary battery, and a lithium secondary battery using the same.

2. Description of the Related Art

A secondary battery is a battery that can be repeatedly charged and discharged. The secondary battery is a kind of chemical battery that generates electric energy between electrodes through a chemical reaction.

SUMMARY OF THE INVENTION

In an exemplary embodiment, there is provided a holder case for secondary battery, which improves its strength for longitudinal compression.

In another exemplary embodiment, there is provided a lithium secondary battery having a bearing power against longitudinal compression.

According to an aspect of the present invention, there is provided a case for secondary battery, which includes a case body having first and second long-side walls opposite to each other, first and second short-side walls, a bottom wall connected to one end portions of the two long-side walls and the two short-side walls, and an opening positioned at the other end portions of the two long-side walls and the two short-side walls while being opposite to the bottom wall; and a first rib disposed on the case body, the first rib extending from a middle portion of the first long-side wall to a middle portion of the second long-side wall via the second short-side wall.

According to another aspect of the present invention, there is provided a lithium secondary battery including an electrode assembly having positive and negative electrode plates isolated from each other and a liquid electrolyte; a case for accommodating the electrode assembly; and a cap assembly for sealing the case. Here, the case includes a case body having first and second long-side walls opposite to each other, first and second short-side walls, a bottom wall connected to one end portions of the two long-side walls and the two short-side walls, and an opening positioned at the other end portions of the two long-side walls and the two short-side walls while being opposite to the bottom wall; and a first rib disposed on an inner or outer surface of the case body, the first rib extending from a middle portion of the first long-side wall to a middle portion of the second long-side wall via the second short-side wall.

In another exemplary embodiment, the case for secondary battery further includes a second rib extending from the middle portion of the first long-side wall to the middle portion of the second long-side wall via the second short-side wall. In this case, the first and second ribs may be disposed surface-symmetrically opposite to each other. N−1 pairs of first and second ribs may be disposed in the vicinity of boundaries of n (n is a natural number of 3 or more) regions into which the space between the bottom surface and the opening is divided, respectively. The first and second ribs may be formed of aluminum or aluminum alloy.

In another exemplary embodiment, the thickness of the first rib protruding to the internal space of the case body is decreased as it reaches from the first short-side wall to the middle portion of each of the first and second long-side walls. The thickness of the first rib may be constant on the first short-side wall and decreased on each of the first and second long-side walls.

In another exemplary embodiment, the width of the first rib extending between the bottom wall and the opening is decreased as it reaches from the first short-side wall to the middle portion of each of the first and second long-side. The width of the first rib may be constant on the first short-side wall and decreased on each of the first and second long-side walls.

In another exemplary embodiment, boundaries at which the two long-side walls come in contact with the two short-side walls have a bent shape.

In another exemplary embodiment, the case body is formed of aluminum or aluminum alloy.

In another exemplary embodiment, the case body is provided with a rib-shaped concave portion formed on an outer surface of the case body so that the first rib and/or second rib are/is fitted into the rib-shaped concave portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Currently, secondary batteries include a lead battery, a nickel-cadmium battery, a nickel-hydrogen battery, a lithium ion battery, a lithium ion polymer battery, and the like. The secondary batteries are divided into a cylinder type, a prismatic type and the like in accordance with their appearances.

Lithium ion batteries have a high energy density per a unit volume. Therefore, various studies on lithium ion batteries have been conducted to apply them to digital conversions, hybrid automobiles, robot industries and the like.

The above information disclosed in this Related Art section is only for enhancement of understanding of the background of the invention and therefore it may contain information that does not form the prior art that is already known to a person of ordinary skill in the art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 1:
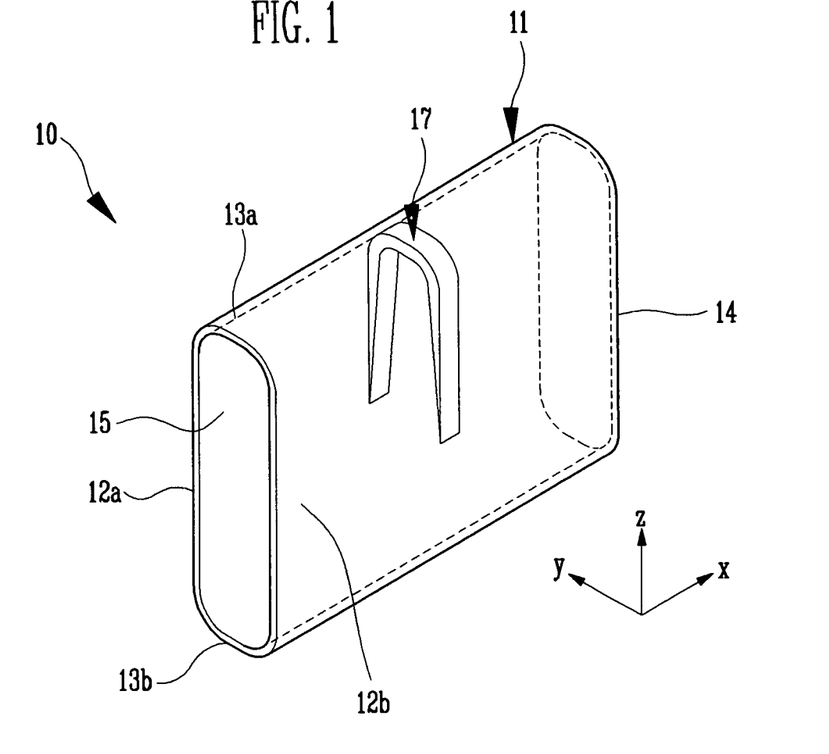
FIG. 1 is a perspective view of a case for secondary battery according to an embodiment of the present invention.

FIG. 1 is a perspective view of a case for secondary battery according to an embodiment of the present invention. For convenience of illustration, the internal structure of the case is shown projected in FIG. 1.

Referring to FIG. 1, the case 10 for secondary battery includes a case body 11 and a rib 17.

The case body 11 is provided with first and second long-side walls 12a and 12b, first and second short-side walls 13a and 13b connected to the two long-side walls 12a and 12b, a bottom wall 14 connected to one end portions of the two long-side walls and the two short-side walls, and an opening 15 positioned opposite to the bottom wall 14 at the other end portions of the two long-side walls and the two short-side walls. The other end portions are opposite to the one end portions with an internal space of the case body 11 interposed therebetween. Here, the internal space of the case body 11 is formed with the two long-side walls and the two short-side walls. The long-side wall refers to a wall at which the length of a side in a width direction (z-direction) of the case body 11 is longer than that of a side in the width direction of the case body 11.

The thickness of each of the long-side, short-side and bottom walls constituting the case body 11 may be appropriately selected in the range of 0.2 to 0.1 mm. The long-side, short-side and bottom walls may be formed of the same material. Aluminum or aluminum ally may be used as the material of these walls.

The case body 11 of this exemplary embodiment has a prismatic structure. Here, the prismatic structure includes a rectangular hexahedron or a structure in which some corners of the rectangular hexahedron have a bent shape or bent surface shape and its horizontal section is of an ellipse or flat plate. For example, a boundary between the long-side wall 12a or 12b and the short-side wall 13a and 13b may be formed into a bent surface. In this case, when the opening 15 is positioned at the top of the case body 11, the case body 11 may be formed into a structure in which its horizontal section has a roughly elliptical or flat-plate shape.

The rib 17 is disposed to have a bearing power against longitudinal compression load of the case body 11. One rib 17 is disposed at a middle portion of the case body 11 in its lateral direction (x-direction) perpendicular to its longitudinal direction. The rib 17 has both sides respectively extending to middle portions of the first and second long-side walls 12a and 12b from the first short-side wall 13a. In another exemplary embodiment, the rib 17 may be replaced by a rib having both sides extending to middle portions of the first and second long-side walls 12a and 12b from the second short-side wall 13b.

In one embodiment, the rib 17 may be formed by properly folding a portion of the case body 11. At this time, a member made of a material harder than that of the case body 11 is inserted into the portion of the case body 11 folded to form the rib 17. In another embodiment, a member made of aluminum or aluminum alloy is separately prepared and then attached on an inner surface of the case body 11.

By using the rib 17, the strength of the case 10 for secondary battery can be enhanced when a compression force is applied in a width direction (z-direction or −z-direction) (hereinafter, referred to as a width direction or longitudinal direction) of a side at which the length of the case 10 for secondary battery is long. The rib 17 of this embodiment will be described in a more detailed manner below.

Figure 2:
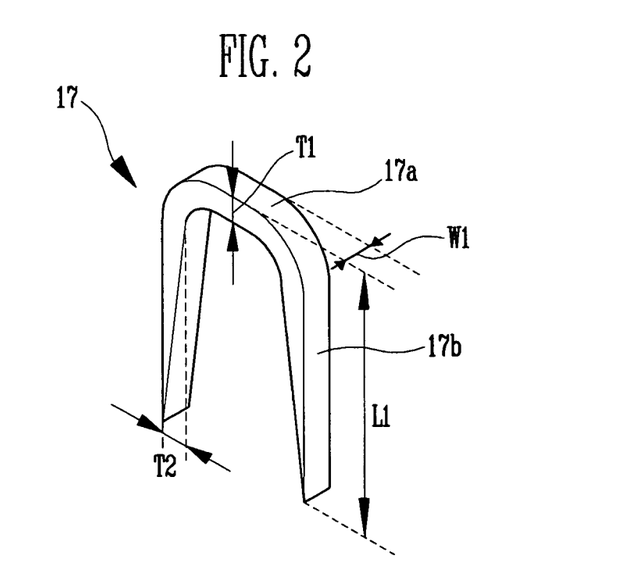
FIG. 2 is a perspective view of a rib provided to the case for secondary battery of FIG. 1.

FIG. 2 is a perspective view of a rib provided to the case for secondary battery of FIG. 1.

Referring to FIGS. 1 and 2, the rib 17 of this embodiment has a horseshoe or U shape. A middle portion 17a of the rib 17 comes in contact with an inner surface of the first short-side wall 13a, and both extending portions of the middle portion 17a come in contact with inner surfaces of the first and second long-side walls 12a and 12b, respectively.

The rib 17 has a first thickness T1, a second thickness T2 and a first width W1. The rib 17 also has a first length L1 extending on the first and second long-side walls 12a and 12b.

The first thickness T1 refers to a thickness of the rib 17 protruded to the inner space of the case body 11 from the inner surface of the first short-side wall 13a. The first thickness T1 is substantially almost constant on the first short-side wall 13a. The second thickness T2 refers to a thickness of the rib 17 protruded to the inner space of the case body 11 from a portion of the inner surface of the first long-side wall 12a and a portion of the inner surface of the second long-side wall 12b. The second thickness T2 is decreased as it reaches from the portion adjacent to the first short-side wall 13a to the middle portion of each of the first and second long-side walls 12a and 12b.

The first width W1 refers to a length of the rib 17 extending between the bottom wall 14 and the opening 15. The first width W1 is set to have a bearing force against longitudinal compression.

The first length L1 is set to be approximately 60 to 100% of the longitudinal length of an electrode assembly accommodated in the case 10. Such a range of the first length L1 has a slight different depending on the material and structure of the rib 17 but is basically set to provide an appropriate bearing force against the longitudinal compress of the case body 11.

The first thickness T1, second thickness T2, first width W1 and first length L1 of the rib 17 may be appropriately adjusted considering how much bearing force is provided against the longitudinal compression of the case body 11, how much the weight of the case is changed depending on the structure of the rib, how much the flow of a liquid electrolyte in the case is changed depending on the structure of the rib 17.

Figure 3A:
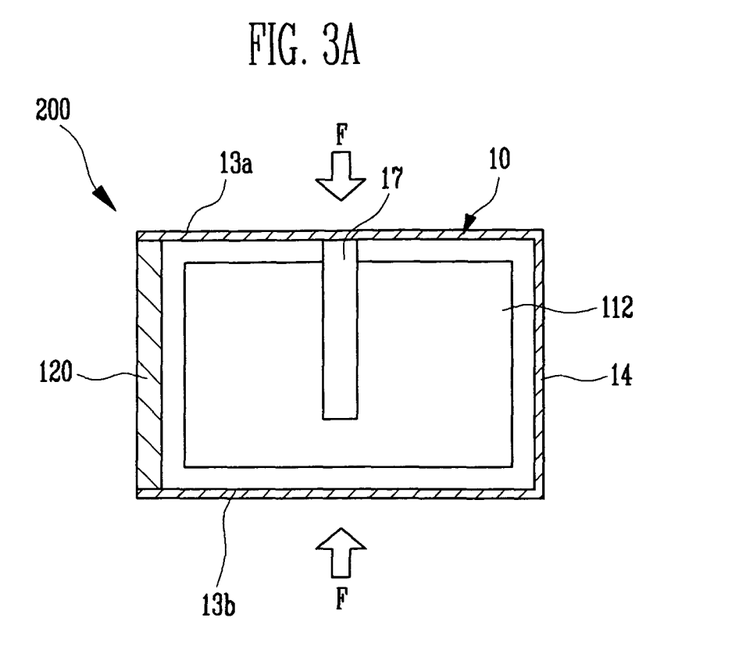
FIGS. 3A and 3B are schematic sectional views illustrating the longitudinal compression property of a lithium secondary battery using the case for secondary battery of FIG. 1.
Figure 3B:
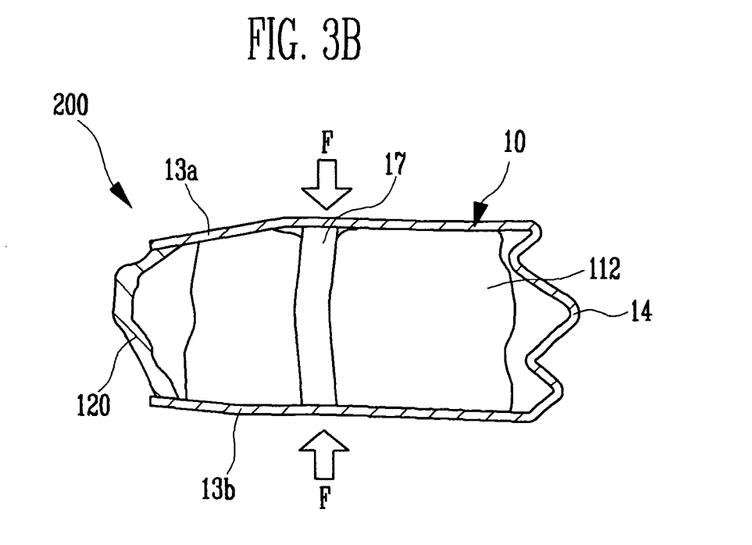

FIGS. 3A and 3B are schematic sectional views illustrating the longitudinal compression property of a lithium secondary battery using the case for secondary battery of FIG. 1.

Referring to FIGS. 3A and 3B, a lithium secondary battery 200 according to an embodiment of the present invention may be prepared by accommodating an electrode assembly 112 together with a liquid electrolyte in the case 10 for secondary battery and then sealing an opening of the case 10 with the cap assembly 120. Here, the electrode assembly 112 is provided with positive and negative electrode plates isolated from each other.

In order to test stability with respect to longitudinal compression, a force F of 13 KN is applied the secondary battery 200 in both width directions of a long side of the secondary battery 200 for two seconds. At this time, the rib 17 is provided to reinforce the longitudinal structure of the case 10, and accordingly, the lithium secondary battery 200 can have a desired bearing force against a longitudinal compression load.

In the case of a lithium secondary battery using a case to which the rib 17 is not provided, the case is easily collapsed, and therefore, the lithium secondary battery is crushed. Then, the prismatic lithium secondary battery certainly proceeds to a firing mode in practical longitudinal compression tests due to reasons that a bottom surface of the case pierces a lower portion of an electrode assembly, that the electrode assembly is pushed toward an opening of the case, that the electrode assembly is short circuited in the vicinity of the opening of the case, and the like.

However, in the lithium secondary battery 200 using the case 10 of this embodiment, the rib 17 has a bearing force against the longitudinal compression load, and therefore, the secondary battery 200 is not easily collapsed. Accordingly, it is possible to prevent the secondary battery 200 from easily proceeding to the firing mode.

Figure 4:
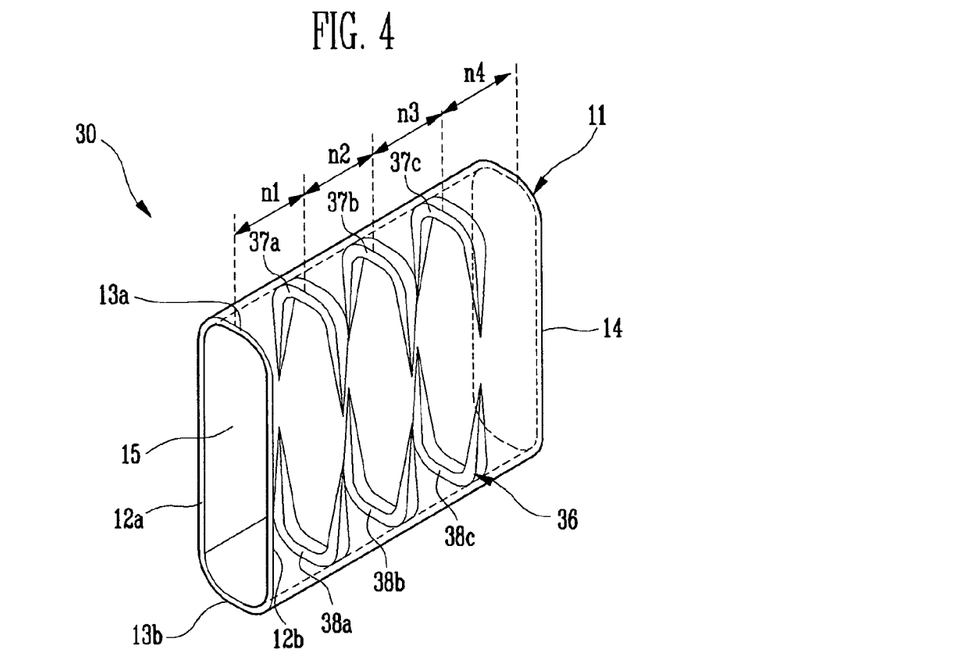
FIG. 4 is a perspective view of a case for secondary battery according to another embodiment of the present invention.

FIG. 4 is a perspective view of a case for secondary battery according to another embodiment of the present invention. For convenience of illustration, the internal structure of the case is shown projected in FIG. 4.

Referring to FIG. 4, the case 30 for secondary battery includes a rib structure 36 having a plurality of ribs and a case body 11 provided with the rib structure 36.

In one embodiment, the rib structure 36 is provided with a first pair of ribs including a 1A-th rib 37a and a 2A-th rib 38a, a second pair of ribs including a 1B-th rib 37b and a 2B-th rib 38b, and a third pair of ribs including a 1C-th rib 37c and a 2C-th rib 38c.

The ribs of each of the pairs are configured so that the first rib 37a, 37b or 37c is opposite to the second rib 38a, 38b or 38c. The first rib refers to a rib extending from an inner surface of a first short-side wall 13a to middle portions of the inner surfaces of the first and second long-side walls 12a and 12b. The second rib refers to a rib extending from an inner surface of a second short-side wall 13b to middle portions of the inner surfaces of the first and second long-side walls 12a and 12b.

The first to third pairs of ribs are disposed in the vicinity of boundaries of regions into which the space between a bottom surface 14 and an opening 15 is divided, respectively. In another exemplary embodiment, the regions divided into four may be divided so that the lengths n1, n2, n3 and n4 in the height or longitudinal direction of the case 30 are substantially identical to one another or so that the lengths n1, n2, n3 and n4 are different from one another, e.g., n2=n3<n1=n4.

In this embodiment, it has been described that the rib structure 36 is provided with plural pairs of ribs, each of which ribs are opposite to each other. However, in another exemplary embodiment, the rib structure may be provided with a plurality of ribs that come in contact with only the first or second short-side wall, or may be provided with at least one pair of ribs respectively disposed at the first and second short-side walls so that they are not opposite to each other or cross each other.

Figure 5A:
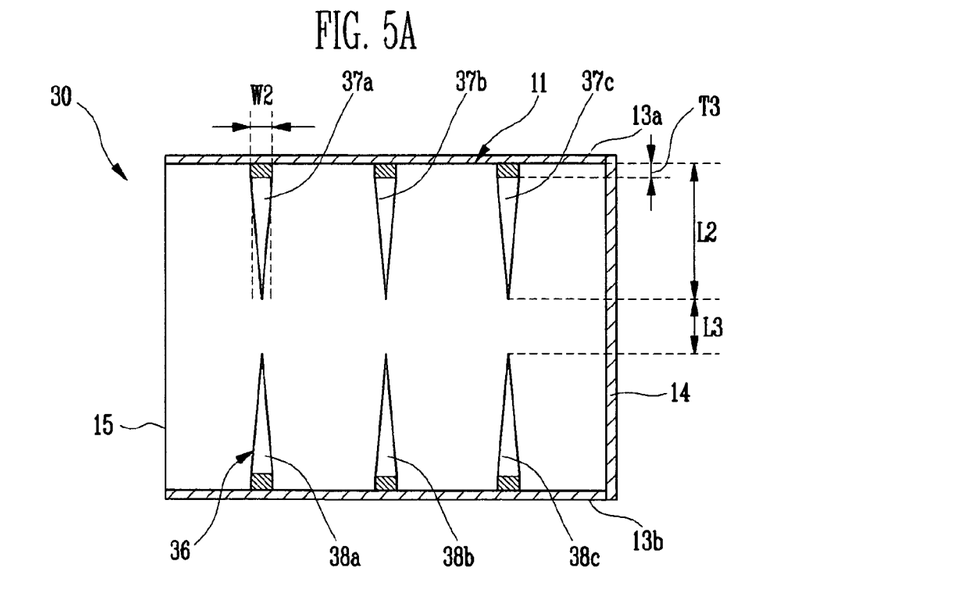
FIG. 5A is a longitudinal sectional view of the case for secondary battery of FIG. 4.
Figure 5B:
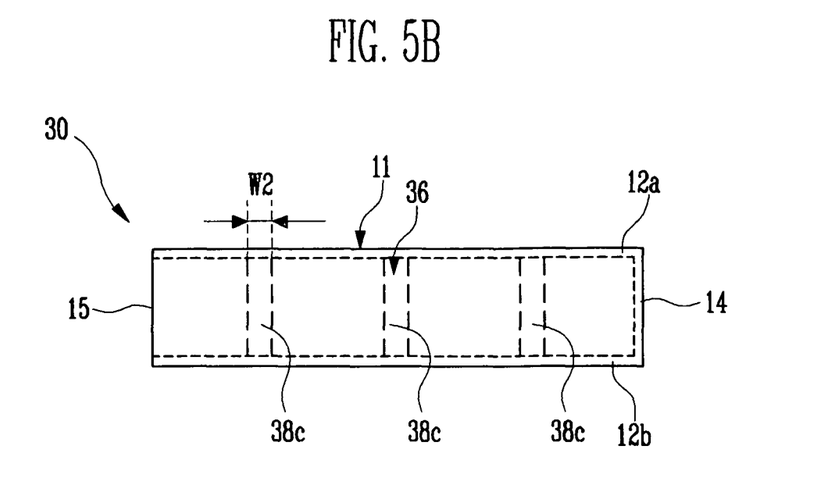
FIG. 5B is a plan view of the case for secondary battery of FIG. 4.
Figure 5C:
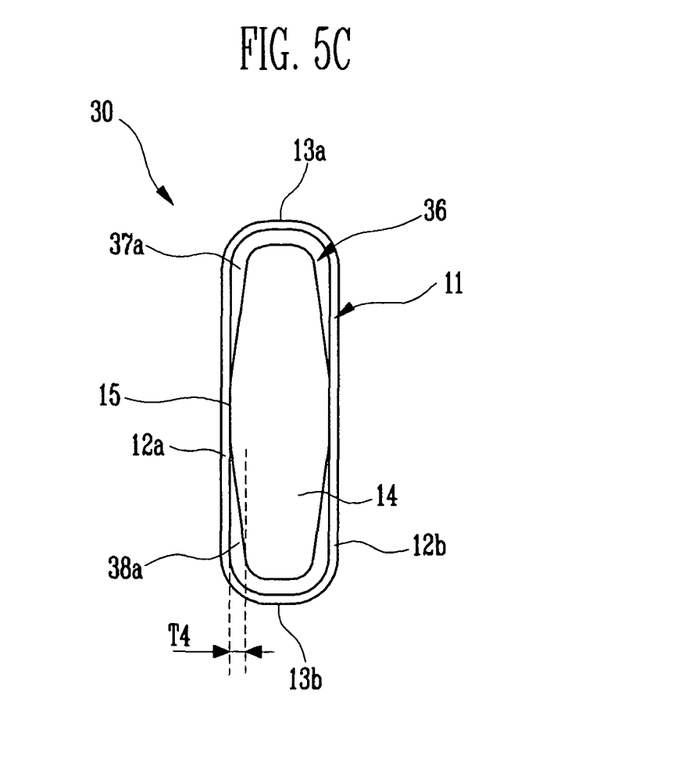
FIG. 5C is a left side view of the case for secondary battery of FIG. 4.

The structure of the aforementioned rib will be in a more detailed manner with reference to FIGS. 5A to 5C. FIG. 5A is a longitudinal sectional view of the case for secondary battery of FIG. 4. FIG. 5B is a plan view of the case for secondary battery of FIG. 4. For convenience of illustration, the internal structure of the case is shown projected in FIG. 5B. FIG. 5C is a left side view of the case for secondary battery of FIG. 4.

In the rib structure 36 of the embodiment illustrated in FIGS. 5A to 5C, the respective ribs substantially have the same structure and shape except their positions. That is, when any one of the ribs is specified and described in this embodiment, the rib is identically applied to the other ribs.

Referring to FIGS. 5A to 5C, each of the ribs has a third thickness T3, a fourth thickness T4, a second width W2 and a second length L2.

As illustrated in FIG. 5A, the third thickness T3 refers to a thickness of the rib protruded to the internal space of the case body 11 from an inner surface of the first short-side wall 13a. The third thickness T3 is substantially almost identical on the first short-side wall 13a. As illustrated in FIG. 5C, the fourth thickness T4 refers to a thickness of the rib protruded to the internal space of the case body 11 from a portion of the inner surface of the first long-side wall 12a and a portion of the inner surface of the second long-side wall 12b. The fourth thickness T4 is decreased as it reaches from a portion adjacent to the first short-side wall 13a to a middle portion of each of the first and second long-side walls 12a and 12b.

The second width W2 refers to a length of the rib extending between the bottom surface 14 and the opening 15. In this embodiment, as illustrated in FIG. 5B, the second width W2 of each of the ribs is substantially constant on the first or second short-side wall 13a or 13b. As illustrated in FIG. 5A, the second width W2 of each of the ribs is gradually decreased as it reaches from a portion adjacent to the first or second short-side wall 13a or 13b to a middle portion of each of the long-side walls 12a and 12b.

The second length L2 is set to be approximately 30 to 45% of the longitudinal direction of the case body 11 accommodated in the case 30. Such a range of the second length L2 is set to allow a predetermined gap to be formed between the respective pairs of ribs.

Meanwhile, in the case 30 of this exemplary embodiment, the respective pairs of ribs opposite to each other are spaced apart from each other by the third length L3. Such a structure allows an electrode assembly to be smoothly inserted into the case 30 for secondary battery. When a liquid electrolyte is injected into the case 30, the structure allows the liquid electrolyte injected through the opening 15 not to be blocked by the rib structure 36 but to be easily moved toward the bottom wall 14.

Figure 6A:
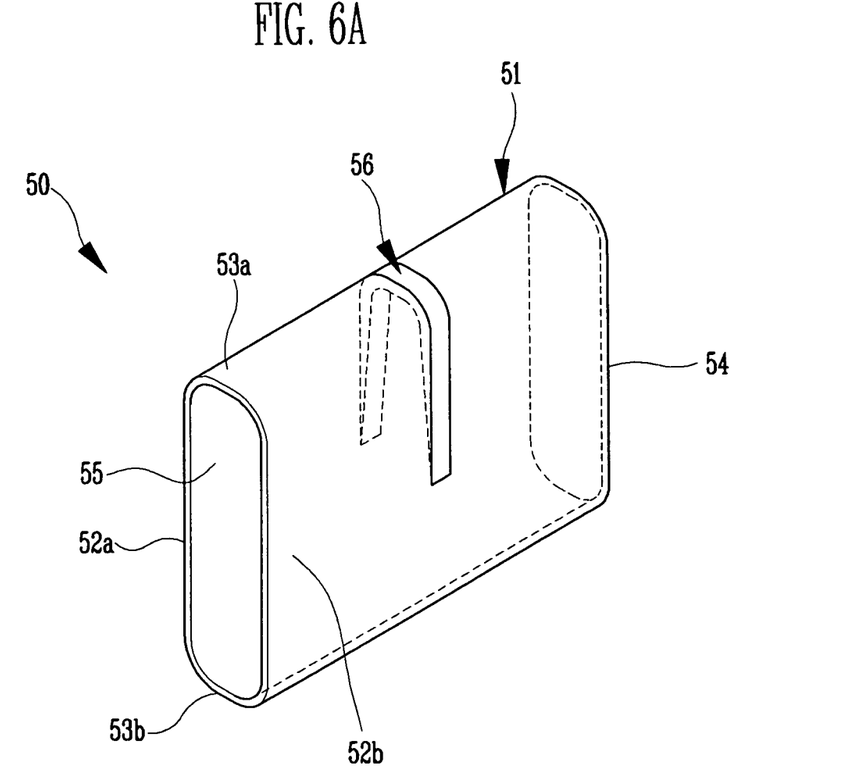
FIG. 6A is a perspective view of a case for secondary battery according to still another embodiment of the present invention.
Figure 6B:
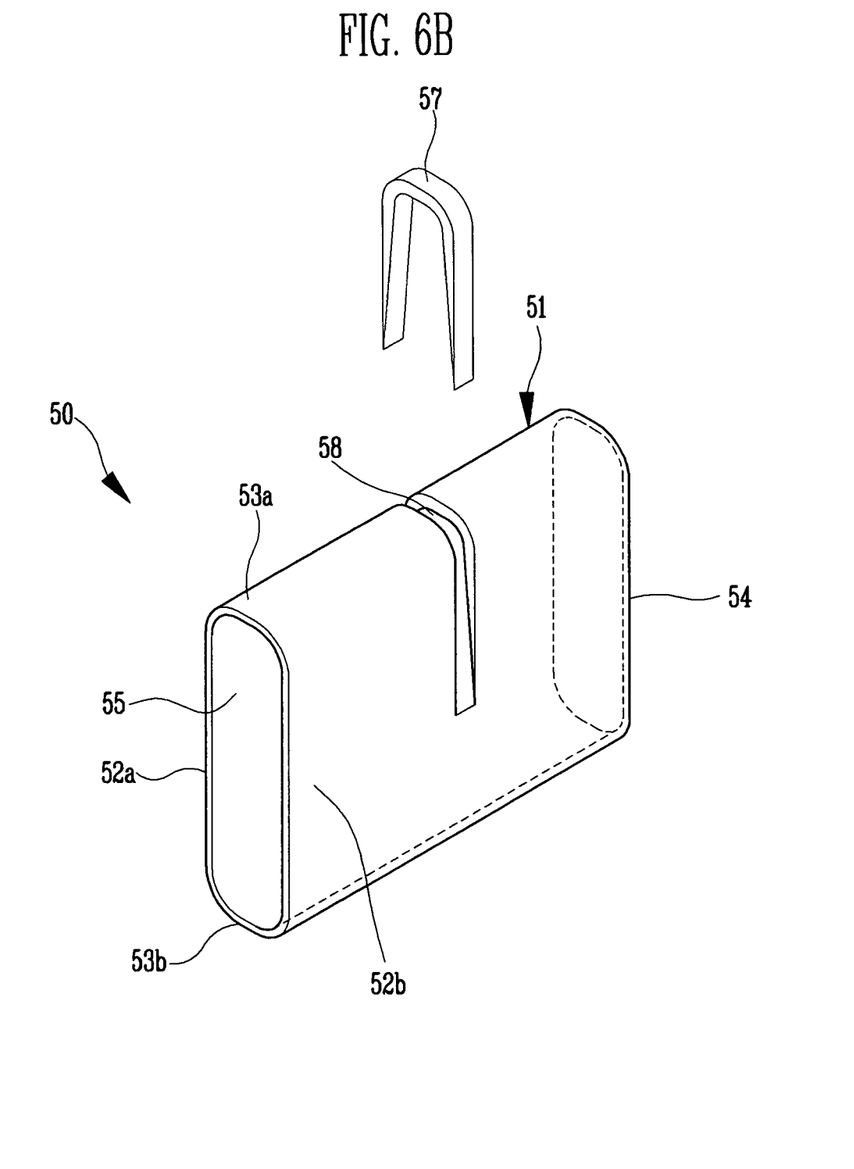
FIG. 6B is an exploded perspective view of the case for secondary battery of FIG. 6A.

FIG. 6A is a perspective view of a case for secondary battery according to still another embodiment of the present invention. FIG. 6B is an exploded perspective view of the case for secondary battery of FIG. 6A.

Referring to FIGS. 6A and 6B, the case 50 for secondary battery includes a case body 51 and a rib structure 56.

The case body 51 is provided with first and second long-side walls 52a and 52b opposite to each other at a predetermined interval, first and second short-side walls 53a and 53b connected to the two long-side walls 52a and 52b, a bottom wall 54 connected to one end portions of the two long-side walls 52a and 52b and the two short-side walls 53a and 53b, and an opening 55 positioned at the other end portions of the two long-side walls 52a and 52b and the two short-side walls 53a and 53b while being opposite to the bottom wall 54.

The thickness of each of the long-side, short-side and bottom walls constituting the case body 51 may be appropriately selected in the range of 0.2 to 0.1 mm. The long-side walls, short-side walls and bottom walls may be formed of the same material. Aluminum or aluminum ally may be used as the material of these walls.

The rib structure 56 includes a rib 57 and a rib-shaped concave portion 58 of the case body 51. The rib 57 may have a structure substantially identical to the rib 17 illustrated in FIG. 2.

The rib-shaped concave portion 58 has a shape concavely bent inside the case body 51 from an outer surface of the case body 51 so that the rib 57 is fitted into the rib-shaped concave portion 58.

In manufacturing of the case body 51, the rib-shaped concave portion 58 may be formed by being injection-molded together with the case body 51 or by primarily forming the case body 51 and appropriately press-molding only a corresponding portion of the case body 51.

According to the aforementioned structure, the case 50 of this exemplary embodiment may substantially have the same structure and function as the case 10 illustrated in FIG. 1.

Figure 7:
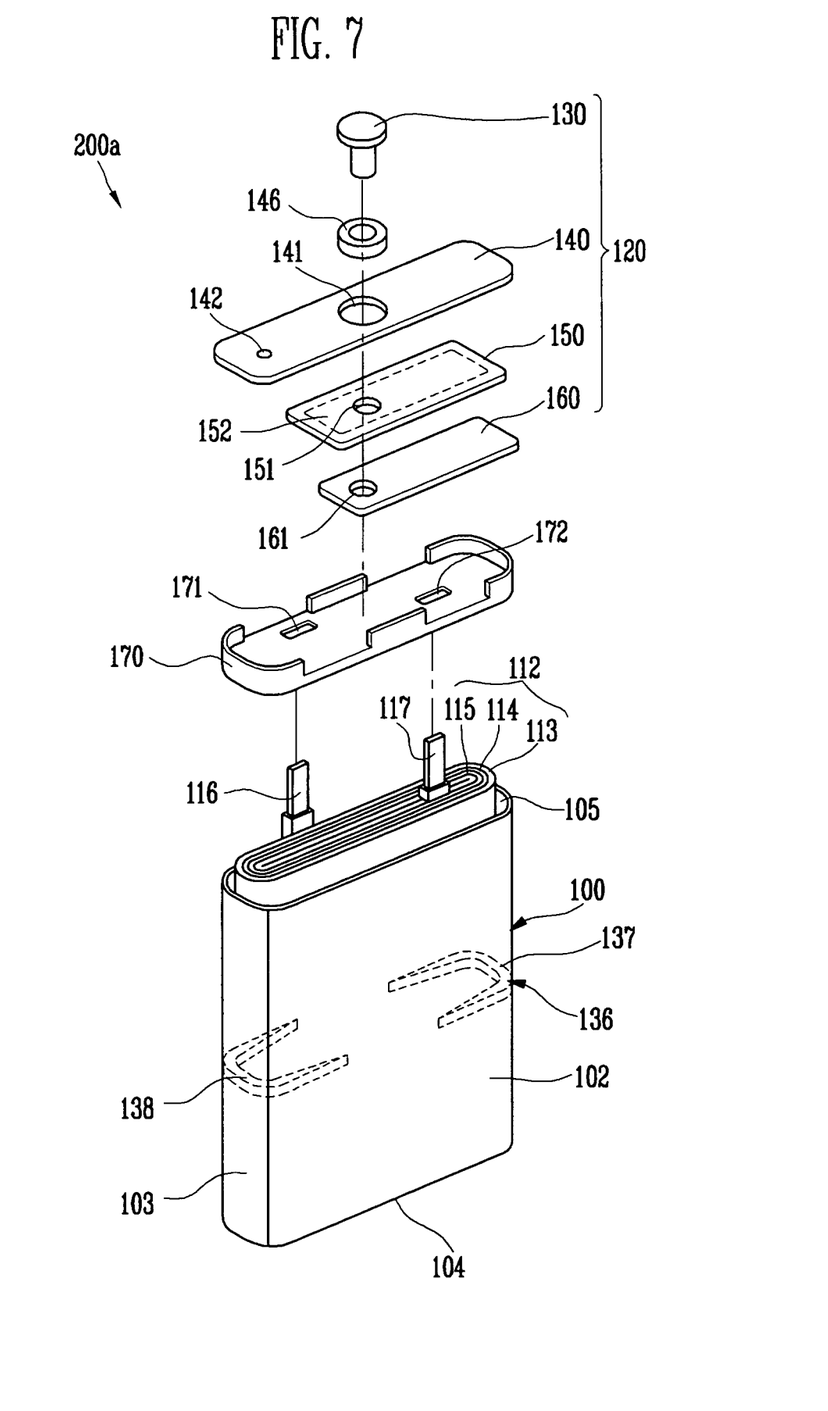
FIG. 7 is an exploded perspective view of a lithium secondary battery using a case for secondary battery according to still another embodiment of the present invention.

FIG. 7 is an exploded perspective view of a lithium secondary battery using a case for secondary battery according to still another embodiment of the present invention. For convenience of illustration, a rib structure provided in the case for secondary battery is shown projected in FIG. 7.

Referring to FIG. 7, the lithium secondary battery 200a according to the exemplary embodiment of the present invention includes a case 100, an electrode assembly 112 accommodated in the case 100, and a cap assembly 120 for sealing an opening 105 of the case 100.

The case 100 includes a case body and a rib structure 136 connected to the case body. The case body is provided with two long-side walls 102 opposite to each other at a predetermined interval, two short-side walls 103 connected to the two long-side walls 102, a bottom wall 104 connected to one end portions of the two long-side walls 102 and the two short-side walls 103, and an opening 105 positioned at the other end portions of the two long-side walls 102 and the two short-side walls 103 while being opposite to the bottom wall 104. The other end portions are opposite to the one end portions with the long-side and short-side walls 102 and 103 interposed therebetween.

The rib structure 136 includes a pair of ribs 137 and 138 disposed opposite to each other on the internal surface of the case body. The first rib 137 is disposed to extend from a middle portion of one long-side wall (the first long-side wall) to a middle portion of the other long-side wall (the second long-side wall) via one short-side wall (the first short-side wall). The second rib 138 is disposed to extend from the middle portion of the first long-side wall to the middle portion of the second long-side wall via the other short-side wall (the second short-side wall). The first and second ribs 137 and 138 may have structures identical to those of the 1B-th rib 37b and the 2B-th rib 38b, illustrated in FIG. 4.

In another exemplary embodiment, the rib structure 136 may be replaced with the structure including a single rib, illustrated in FIG. 1 or 6A, or may be replaced with a rib structure including a plural pairs of ribs, like the structure illustrated in FIG. 4.

The electrode assembly 112 includes a first electrode plate 113, a second electrode plate 115 and a separator 114. The first and second electrode plates 113 and 115 may be respectively formed as positive and negative electrode plates, and vice versa. The first and second electrode plates 113 and 115 may be stacked with the separator 114 interposed therebetween and then wound in a jelly-roll form. In one embodiment, a first electrode tab 116 is welded to the first electrode plate 113, and a second electrode tab 117 is welded to the second electrode plate 115. End portions of the first and second electrode tabs 116 and 117 are protruded upward.

The cap assembly 120 includes a cap plate 140, an insulating plate 150, a terminal plate 160 and an electrode terminal 130. The cap assembly 120 is connected to the top opening 105 of the case 100 with a separate insulating body 170 interposed therebetween, so as to seal the case 100.

The cap plate 140 may be formed as a metal plate having a size and shape corresponding to the top opening 105 of the case 100. Aluminum or aluminum alloy, of which weight is light, may be used as the material of the cap plate 140. A first terminal through-hole 141 having a predetermined size is formed at the center of the cap plate 140, and an electrolyte injection hole 142 is formed at one side of the cap plate 140.

The first terminal through-hole 141 is formed to have a larger diameter than that of the electrode terminal 130. The electrode terminal 130 is inserted into the first terminal through-hole 141 with a gasket tube 146 interposed therebetween. The gasket tube 146 allows the electrode terminal 130 to be isolated from the cap plate 140.

After the cap assembly 120 is connected to the top opening 105 of the case 100, an electrolyte is injected into the case 100 through the electrolyte injection hole 142. The electrolyte injection hole 142 is sealed by a separate sealing member.

The insulating plate 150 may be formed of an insulating material and allows the cap plate 140 to be isolated from the terminal plate 160. An insertion hole 152 is provided at a lower surface of the insulating plate 150. Here, the insertion hole 152 has a size corresponding to that of the terminal plate 160 so that the terminal plate 160 is inserted therein. The insulating plate 150 is provided with a second terminal through-hole 151 formed at a position corresponding to the first terminal through-hole 141. The second terminal through-hole 151 is formed to have a diameter almost identical to that of the electrode terminal 130.

The terminal plate 160 may be formed in a plate shape with nickel or nickel alloy. The terminal plate 160 is provided with a third terminal through-hole 161 formed at a position corresponding to the second terminal through-hole 151 of the insulating plate 150. The electrode terminal 130 passing through the second terminal through-hole 151 is inserted into the third terminal through-hole 161 and connected to the insulating body 170.

The insulating body 170 is provided with a first electrode tab hole 171 and a second electrode tab hole 172. The first electrode tab 116 is connected to the cap plate 140 by passing through the first electrode tab hole 171, and the second electrode tab 117 is connected to the electrode terminal 130 by passing through the second electrode tab hole 172. The insulating body 170 is connected to the lower portion of the cap assembly 120, and thus, allows the cap assembly 120 to be electrically isolated from the electrode assembly 112.

The lithium secondary battery 200a of this exemplary embodiment is provided with the case 100 having a reinforcing structure like the rib structure 136, which can have an enhanced strength with respect to longitudinal compression.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A case for secondary battery having an interior and exterior portion, said interior portion housing an electrode assembly, comprising:
   a case body having first and second long-side walls opposite to each other, separated by first and second short-side walls, a bottom wall connected to one end portions of the two long-side walls and the two short-side walls, and an opening positioned at the other end portions of the two long-side walls and the two short-side walls while being opposite to the bottom wall; and
   a first rib disposed on the interior portion of the case body, the first rib extending from a middle portion of the first long-side wall to a middle portion of the second long-side wall via the second short-side wall, said first rib having a width less than a longitudinal length of any one of the two long side walls or the two short side walls,
   wherein a length (L1) of the first rib extending from the second short side wall to the middle portion of first or second long side wall is approximately greater than 60% and approximately less than 100% of a longitudinal length of an electrode assembly inserted in the case body.

2. The case for secondary battery according to claim 1, further comprising a second rib extending from the middle portion of the first long-side wall to the middle portion of the second long-side wall via the first short-side wall.

3. The case for secondary battery according to claim 2, wherein the first and second ribs are disposed surface-symmetrically opposite to each other with an internal space of the case body, interposed therebetween.

4. The case for secondary battery according to claim 3, wherein n1 pairs of first and second ribs are disposed in the vicinity of boundaries of n regions into which the space between the bottom surface and the opening is divided, respectively,
   wherein n is a natural number of 3 or more.

5. The case for secondary battery according to claim 3, wherein the first and second ribs are formed of aluminum of an aluminum alloy.

6. The case for secondary battery according to claim 1, wherein the thickness of the first rib protruding to the internal space of the case body is decreased as it reaches from the second short-side wall to the middle portion of each of the first and second long-side walls.

7. The case for secondary battery according to claim 6, wherein the thickness of the rib is constant on the second short-side wall and decreased on each of the first and second long-side walls.

8. The case for secondary battery according to claim 6, wherein the width of the first rib extending between the bottom wall and the opening is decreased as it reaches from the second short-side wall to the middle portion of each of the first and second long-side walls.

9. The case for secondary battery according to claim 8, wherein the width of the first rib is constant on the second short-side wall and decreased on each of the first and second long-side walls.

10. The case for secondary battery according to claim 1, wherein boundaries at which the two long-side walls come in contact with the two short-side walls have a bent shape.

11. The case for secondary battery according to claim 1, wherein the electrode assembly has positive and negative electrode plates isolated from each other and a liquid electrolyte; and
   a cap assembly for sealing the case.

* * * * *